Figure 1:
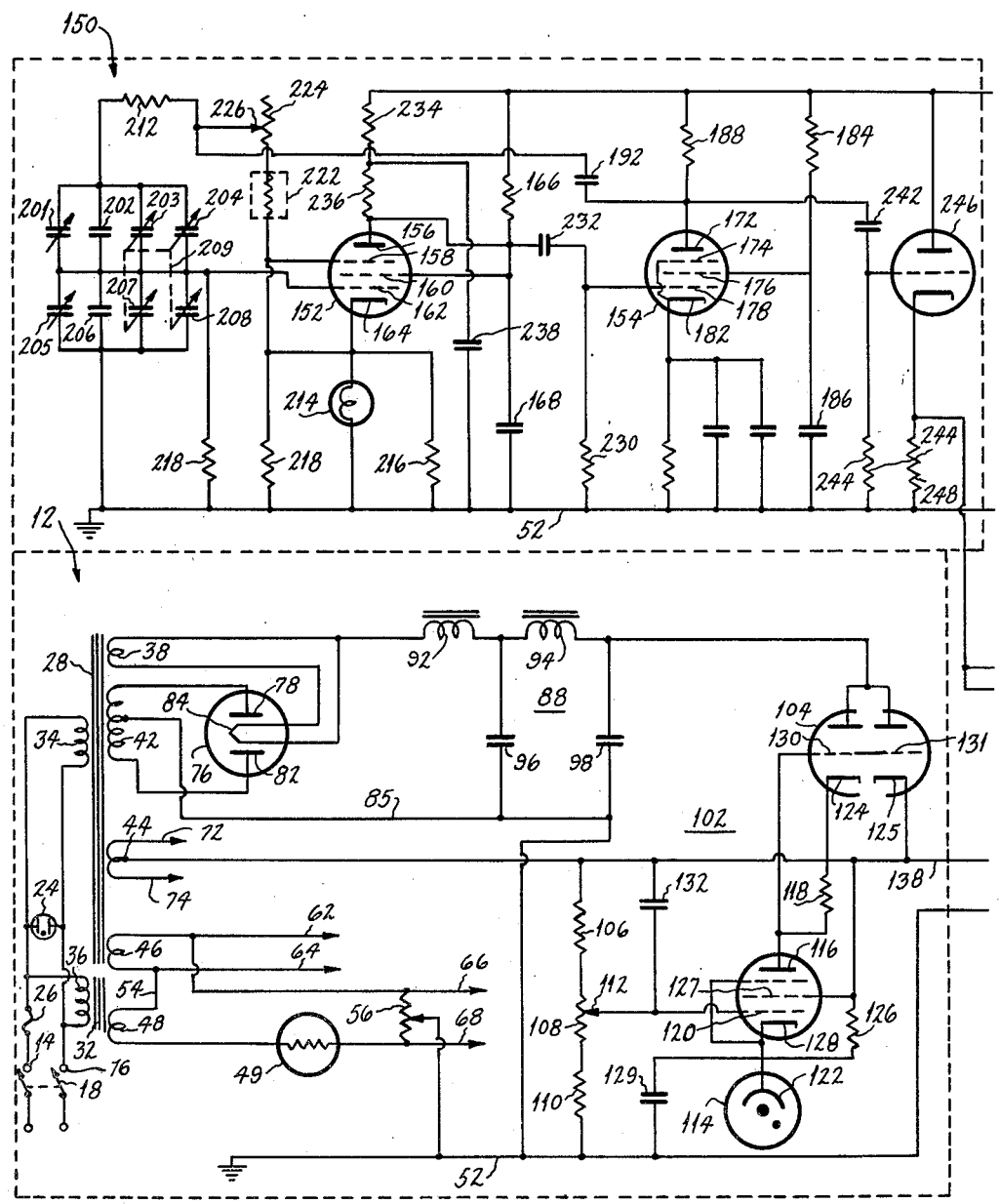

Oct. 2, 1956 N. L. COHEN 2,765,437
TWO-PHASE POWER GENERATOR
Filed March 8, 1954 2 Sheets-Sheet 1

INVENTOR.
NATHANIEL L. COHEN
BY George Sipkin
Lee J. Huntzberger
ATTORNEYS

United States Patent Office 2,765,437
Patented Oct. 2, 1956

2,765,437

TWO-PHASE POWER GENERATOR

Nathaniel L. Cohen, New Milford, N. J., assignor to the United States of America as represented by the Secretary of the Navy Application March 8, 1954, Serial No. 414,914

3 Claims. (Cl. 321—53)

This invention relates to a two-phase power generator and more particularly to a two-phase power generator adapted to provide, selectively, a two-phase single frequency power output that is substantially constant in power level over a wide range of frequencies.

Split phase motors, and more particularly, capacitor motors include two motor windings. The windings are usually placed in slots ninety electrical degrees apart. Both windings are energized in parallel at starting. Connected in series with the starting winding of a capacitor motor is a capacitor. The capacitor helps to produce a phase displacement of substantially ninety degrees whereby there is obtained a rotating field. If the starting winding is cut out of the circuit when the motor has attained normal speed, the motor is called a capacitor-start induction-run motor. If the starting winding is not cut out of the circuit, a portion of the starting capacitor is left in series with it at running speed, and it is called a capacitor start-and-run motor. In either case the impedance of the capacitor limits the motor operation to a very narrow range of frequency.

This invention provides a means whereby a split phase motor may be operated over a very wide range of frequency. With this device it is possible to maintain synchronism in the motor though the supply frequency varies widely. This invention may be adapted to purposes other than split-phase motors. The invention includes an improved oscillator having a stability of one part in ten thousand.

This invention includes a variable oscillator for generating selectively each of a band or range of frequencies. Each generated frequency is substantially a true sine wave in character. Phase splitting, for providing two phases, is accomplished by means of a differentiating circuit and an integrating circuit. The differentiating circuit consists of a capacitor and a resistor while the latter circuit consists of identical elements with their positions interchanged. A 90° phase difference, constant at all frequencies, exists between the outputs of the differentiating-integrating circuits. The differentiating and integrating circuits each are connected in circuit with a paraphase amplifier which provides push-pull voltages for application to the grids of an associated push-pull amplifier. The plates of the push-pull amplifier tube are conventionally connected to the primary of an output transformer, the secondary of which is loaded for regulation by a fixed resistor in series with a thermistor. The thermistor is characterized by a resistance which varies with temperature, and the particular thermistor used has a negative resistance vs. temperature characteristic. The temperature is determined by the power dissipated within it and hence by the voltage applied to it. Changes in the resistance of the thermistor are reflected back by the transformer as changes in the load as seen by the plates of the push-pull amplifier tube. Hence, if the voltage applied to the grids of the push-pull amplifier tube increases, the voltage at the plates of that tube tends to increase, which in turn increases the current through the thermistor. This in turn results in reflection of a lower load impedance to the push-pull amplifier resulting in a lower voltage output at the output terminals of the circuit. The regulation effect of the thermistor is used herein to fully compensate for the variation in voltage at the input to the differentiator and integrator circuits and the net effect is a two-phase generator providing a two-phase output having a constant 90° phase relationship and a constant amplitude. The entire circuit combination is characterized by excellent frequency stability and a constant amplitude two-phase output over the operating frequency range of the variable oscillator.

An object of this invention is to provide a two-phase power generator.

A further object is to provide a two-phase power generator adapted to provide a two-phase power output separated by 90° over a wide range of frequencies.

A further object is to provide a two-phase power generator adapted to provide a two-phase power output over a wide range of frequencies wherein the output voltage is constant in amplitude and has the character of a sine wave.

A further object is to provide a two-phase power generator including an improved oscillator.

Figure 2:
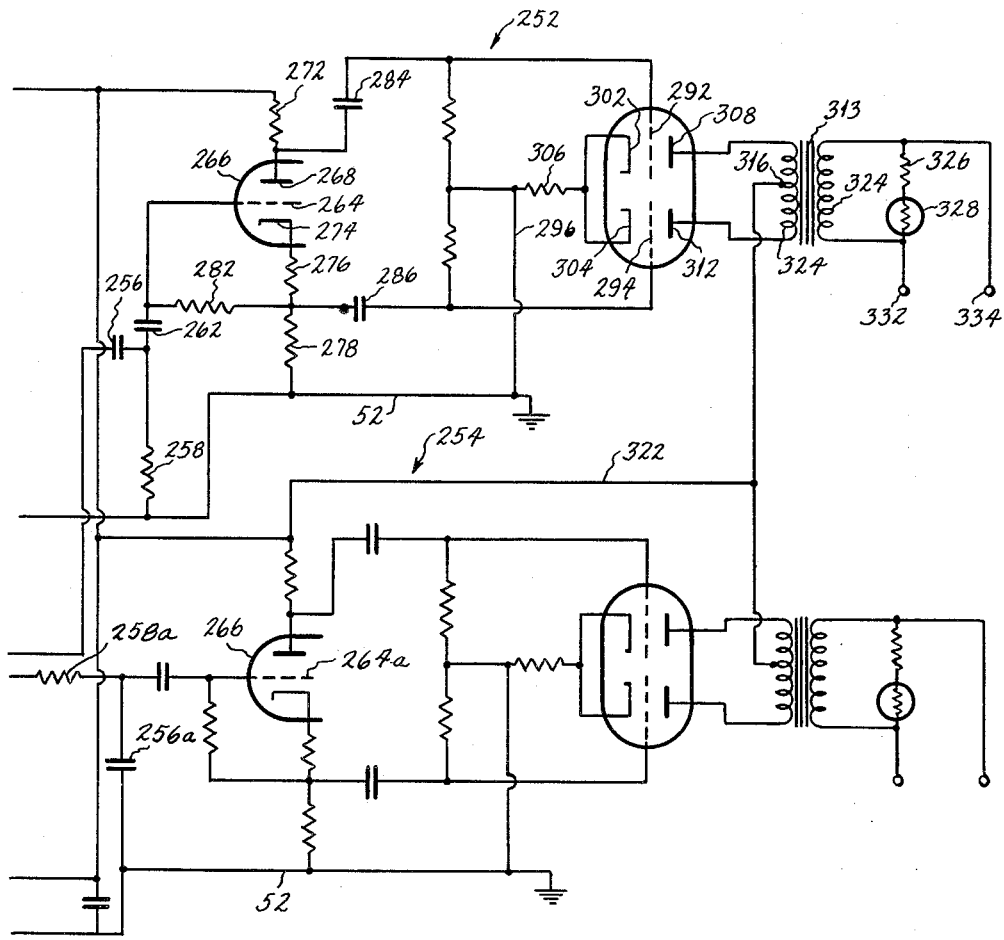

Other objects and many of the attendant advantages of this invention will be readily appreciated as the same becomes better understood by reference to the following detailed description when considered in connection with the accompanying drawings wherein:

Fig. 1 is a schematic diagram of the oscillator and power supply portions of the circuit forming part of a preferred embodiment of this invention, and Fig. 2 is a schematic diagram of the phase splitter forming part of the same circuit.

The lower part of Fig. 1 is a regulated direct current power supply 12. The power supply circuit 12 includes a pair of input terminals 14 and 16 to which is adapted to be connected a regulated alternating current power supply. A switch 18 is provided for closing the circuit between the regulated alternating current power supply, not shown, and the input terminals 14 and 16 of the regulated direct current power supply circuit 12. A glow discharge indicator bulb 24 is conventionally connected across the alternating current power supply, not shown, and the input terminals 14 and 16 of the direct current power supply circuit 12. A fuse 26 is connected directly in series with input terminal 14. A pair of transformers 28 and 32 having primary windings 34 and 36, respectively, connected directly across the input terminals 14 and 16 of the circuit 12 are provided with a plurality of secondary windings 38, 42, 44, 46 and 48. A grounded lead 52 provides a reference potential. The secondary windings 38, 44, 46, 48 provide the necessary voltages for the heating filaments of the various tubes employed herein. Connections between various filaments and the corresponding secondaries of the transformers are not shown to avoid cluttering the drawing. Connected in series with the secondary winding 48 for purposes of filament voltage regulation is a regulator tube 49 which consists of an iron wire enclosed in a hydrogen-filled envelope and is of the type known as an Amperite regulator or ballast tube. The secondary windings 46 and 48 are connected in series by a lead 54 and the combination of the two secondary windings are bridged by a resistor 56, center tapped to ground by a lead 58. The output across the terminals 62 and 64 of the secondary winding 46 is not regulated, whereas the output at the terminals 66 and 68 of the serially connected secondary winding 46 and 48 for the filaments of the oscillator tubes 152 and 154 is regulated. The output terminals 72 and 74 of the secondary winding 44 are referenced to a positive potential with respect to ground and are for the filaments of tube 104. The various filament supplies shown are for meeting the needs of the various tubes under their respective operating conditions.

A full wave rectifier 76 having plates 78 and 82 connected to opposite terminals of the secondary winding 42 and a filament 84 connected directly across the secondary winding 38 provides the input power for the circuit. The secondary winding 42 is center-tapped to ground by means of the lead 85 connected to a lead 86 which in turn is connected to the ground lead 52. A choke input filter 88 including a choke 92 in series with a pi-section having a choke 94 and a pair of condensers 96 and 98 are connected directly across the output of the full wave rectifier tube 76. The filtered output from the filter 88 is further passed through a smoothing circuit generally shown at 102 for eliminating the ripple.

The smoothing circuit 102 includes a twin triode 104. The tube 104 functions as a variable resistor to regulate the output voltage of the power supply 12. A twin triode, the two sections of which are connected in parallel, is used in order that it be able to carry the load. In series with the tube 104 between the output of the filter 88 and ground at 52 ins a voltage divider including resistors 106, potentiometer 108, and resistor 110. The load voltage is developed across the resistors of the voltage divider. The potentiometer 108 has a tap 112.

Connected in parallel across the voltage divider resistors 106, 108, and 110 are a serially connected voltage regulator tube 114, a pentode 116, and the plate load resistor 118 for the pentode. The tap 112 of the potentiometer is connected to the control grid 120 of the pentode for providing a negative bias. The anode 122 of the voltage regulator tube 114 is connected to the cathodes 124 and 125 of the twin triode 104 by means of a resistor 126 in order to permit the gas in the voltage regulator to ionize when the power supply is first turned on. Since the voltage at the cathode of the twin triode 104 is the regulated load voltage, the potential on the screen grid 127 of the pentode is retained at a substantially constant positive operating bias.

The cathode 128 of the pentode 116 is retained at a fixed potential relative to ground by the voltage regulator tube 114. A condenser 129 is connected in shunt across the voltage regulator tube 114 in order to bypass any slight voltage variations, thereby stabilizing the potential of cathode 128.

The plate of the pentode 116 is connected to the grids 130 and 131 of the twin triode 104 providing the necessary negative bias for the tube. The bias on the grids 130 and 131 therefore varies directly with the plate current of the pentode 116. The plate current of a pentode varies steeply with the bias on its control grid. It is essential to communicate instantaneously any change in the output voltage directly to the control grid 120. This is accomplished by means of the condenser 132.

If the output voltage tends to increase regardless of whether it results from a decrease in load current or an increase in voltage from the filter 88, this tendency is immediately communicated to the control grid 120 of the pentode 116. The voltage at the cathode 128 remains constant. More plate current flows through pentode 116 causing a greater voltage drop across the plate load resistor 118. The bias on the grids 130 and 131 of the twin triode 104 accordingly becomes more negative causing the tube 104 to act as a higher resistance, keeping the load voltage constant. Conversely, when the load voltage falls the tube 104 acts as a lower resistance. Because of the high amplification of the pentode 116, small variations in load voltage are amplified sufficiently to cause the regulating action to take place. The power supply 12 has excellent sensitivity and effectively removes ripple from the output. The load obtains the regulated voltage output through lead 138.

In the upper part of Fig. 1 there is shown an oscillator circuit 150 similar to a Wien bridge. Oscillator circuit 150 includes a pentode 152 and a beam power amplifier 154. Pentode 152 includes a plate 156, a suppressor grid 158, a screen grid 160, and a control grid 162, and a cathode 164. The suppressor grid 158 and the cathode 164 are at the same potential. The screen grid is connected to the junction between a resistor 166 and a capacitor 168 serially connected between the plate supply and the ground lead 52. The resistor capacitor combination has a long time constant. The potential on the screen grid 160 remains constant irrespective of any fluctuations in the plate supply voltage.

The beam power tube 154 includes a plate 172, an internal shield 174 connected to the cathode, a screen grid 176, a control grid 178 and a cathode 182. The screen grid 176 is connected, like the screen grid 160 of the pentode 152, to the junction of a resistor 184 and the capacitor 186. The screen grids of each tube thereby remain at a substantially constant potential. A plate load resistor 188 is provided for the beam power tube 154. A feedback circuit from the plate 172 of the beam power tube 154 to the control grid 162 of the pentode 152 includes a coupling condenser 192. The coupling condenser 192 connects the plate 172 to a bridge circuit. The bridge circuit includes two series connected sections of four parallel condensers each. Two condensers of each series, namely 203, 204, and 207, 208 form a four section ganged variable condenser 209. Each series further includes separate selectively variable condensers 201 and 205 respectively, and fixed condensers 202 and 206, respectively. Connected in parallel with the lower series of condensers is a fixed large resistor 210. Serially connected with the upper series of condensers is a resistor 212. In the cathode circuit of the pentode 152, there is connected a 120 volt bulb 214 bridged by a fixed resistor 216 and a second resistor 218. The cathode 164 is serially connected with the resistor 212 opposite that connected to the condensers 201, 202, 203, and 204 through a thermistor 222 and a small rheostat 224. Rheostat 224 has a tap 226 forming part of the feedback circuit from the plate 172 of the beam power tube 154. The output at the plate 156 of the pentode 154 is coupled to the control grid 178 of the beam power tube 154 through an RC circuit comprising the resistor 230 and condenser 232. The plate loading for the pentode 152 includes a pair of resistors 234 and 236. Connected between ground and the junction between the resistors 234 and 236 in the plate circuit of pentode 152 is a bypass capacitor 238. The output signal from the beam power pentode 154 is coupled through an RC circuit comprising a capacitor 242 and resistor 244 to the input of a class A amplifier triode 246. Class A amplifier triode 246 is connected as a cathode follower having a cathode resistor 248 in its cathode circuit.

By using a Wien bridge oscillator it is possible to conveniently obtain a wide range of frequencies. The wave shape of the selected frequency is very nearly a true sine wave. The addition of the thermistor 222 improves the frequency stability; excellent frequency stability and constant output voltage are obtained over a wide frequency range. Through the use of a cathode follower at the output of the Wien bridge oscillator it is possible to obtain a relatively high upper frequency limit since the shunting effects of the tube capacitance and wiring are correspondingly small. The input impedance is increased by the degeneration so that it imposes less shunting effect on the preceding stage. Though the cathode follower has less than unity voltage gain it produces power gain along with the advantages recited above.

The selected frequency output of the circuit 150 is fed simultaneously into two substantially identical phase splitters 252 and 254. The difference between the phase splitters 252 and 254 is that one has a resistor-capacitor differentiating circuit while the other has a resistor-capacitor integrating circuit. The sizes of the corresponding components are identical. The purpose of this arrangement is to obtain a 90° phase difference constant at all frequencies between the outputs of the two phase splitters 252 and 254. Since the circuits 252 and 254 are identical except for the manner of connection of the input resistor-capacitor elements only the circuit 252 is described.

In the circuit 252 the input capacitor 256 and the input resistor 258 are connected to provide a differentiated output. The capacitor 262 couples the grid 264 of one-half of a double triode 266 to one end of the resistor 258. The plate 268 of the double triode 266 is connected to the regulated supply through a plate load resistor 272. The other half of double triode 266 is in circuit 254. Capacitor 256a and resistor 258a are connected to provide an integrated output, such that the phase angle between voltage at grid 264 and grid 264a are in phase quadrature. The cathode 274 of the tube 266 is connected to ground by a pair of series-connected resistors 276 and 278. In order to permit the phase splitter circuit to accommodate negative signals of higher amplitude on the grid without the effects of cut off limiting the resistor 282 is connected between the grid and the junction between resistors 276 and 278. The bias is reduced because the resistor 282 is terminated at a more positive point on the cathode resistor. The outputs of the phase splitter circuit 252 are derived at the plate 268 and the junction between the resistors 276 and 278 respectively. The two outputs are coupled by identical capacitors 284 and 286, respectively, to the grids 292 and 294 of a twin triode forming part of a push-pull amplifier. A pair of identical series-connected high value grid leak resistors center-tapped to ground by lead 296 are connected directly across both outputs from the plate and cathode circuits of tube 266. The cathodes 302 and 304 of the push-pull amplifier tube are connected by means of a cathode resistor 306 to ground. The plates 308 and 312 are conventionally connected across the terminals of the primary winding 314 of an output transformer 313. Winding 314 of the output transformer is centertapped at 316 and connected to the regulated supply through the leads 318 and 322. A constant load is connected across the secondary winding of the output transformer 313 and comprises a fixed resistor 326 in series with a thermistor 328. The loading by means of the components 326 and 328 act to regulate the amplitude of the output. As the voltage applied to the grids 292 and 294 of the push-pull amplifier tube increases, the voltage at the plates 308 and 312 tends to increase which in turn causes an increase in current through the thermistor 328. The increase in current through the thermistor results in reflection of a lower load impedance to the push-pull amplifier tube resulting in a lower voltage output at the terminals 332 and 334. Thus the regulator effect of the thermistor as applied here fully compensates for the variation in voltage at the input to the phase splitter.

In operation, the power supply circuit 12 supplies a regulated constant plate voltage for each of the tubes in the Wien Bridge oscillator circuit 150 and the phase splitter circuits 252 and 254. The power supply circuit also supplies the necessary filament voltages. The output frequency of the Wien Bridge oscillator is controlled in the main by the variable condensers 203, 204, 207 and 208 and yield a single frequency sine wave output. The addition of a thermistor in the feedback loop increased the stability of the circuit to around one part in ten thousand.

The output single frequency from the Wien Bridge oscillator is made available to a pair of separate phase-splitter channels 252 and 254. The input to each of the phase splitter channels is a resistor-capacitor circuit which is identical for each of the channels. However, the resistor-capacitor circuit of the phase splitter channel 252 is arranged as a differentiator whereas the resistor-capacitor 256a—258a circuit to the channel 254 is arranged as an integrator circuit. The output of each phase splitter channel is fed into a push-pull amplifier tube and an output transformer. The output of each push-pull amplifier is shunted by a voltage regulator consisting of a thermistor in series with a fixed resistance. This regulator adjusts the effective load impedance on the push-pull amplifier to keep the output voltage substantially constant over the useful frequency range. A substantially 90° phase difference constant over a frequency range of 10 to 1 exists between the outputs of the two phase splitter channels 252 and 254. Because frequency variations do affect the amplitudes produced by both circuits the differentiator output tends to increase in amplitude while the integrator output tends to decrease in amplitude as the frequency rises. However, the amplitude variations are eliminated by means of the voltage regulator at the output of each of the phase splitter channels 252 and 254 as described above.

Obviously many modifications and variations of the present invention are possible in the light of the above teachings. It is therefore to be understood that within the scope of the appended claims the invention may be practiced otherwise than as specifically described.

I claim:

1. A two-phase power generator comprising a variable oscillator adapted to provide selectively a single frequency output over an operating range of frequencies, a pair of phase splitter circuits, each of which terminate in a push-pull amplifier connected to said oscillator, one of said phase splitter circuits provided at its input with a resistor-capacitor combination connected as a differentiator circuit, the other of said phase splitter circuits provided at its input with an identical resistor-capacitor combination connected as an integrator circuit, a regulated power supply for the several circuits whereby the outputs from the push-pull amplifier terminations of said pair of phase splitter circuits are separated by substantially 90° phase difference constant over the operating range of frequencies and are constant in voltage amplitude.

2. The two-phase power generator as described in claim 1 further including regulator means at the output of each of the phase splitter circuits.

3. The two-phase power generator as described in claim 1 wherein said variable oscillator is a Wien Bridge oscillator and includes a thermistor in the feedback loop for increased stability.

References Cited in the file of this patent

UNITED STATES PATENTS

| | | |
|---|---|---|
| 2,341,232 | Norton | Feb. 8, 1944 |
| 2,476,946 | Oliver | July 19, 1949 |
| 2,585,573 | Moore | Feb. 12, 1952 |
| 2,648,773 | Wallace | Aug. 11, 1953 |
| 2,668,238 | Frink | Feb. 2, 1954 |